(12) United States Patent
Lee

(10) Patent No.: US 11,140,246 B2
(45) Date of Patent: Oct. 5, 2021

(54) HINGE STRUCTURE FOR FOLDABLE DEVICE INCLUDING SMARTPEN RECEIVING PORTION

(71) Applicant: East Global Co., Ltd., Incheon (KR)

(72) Inventor: Hye Ran Lee, Incheon (KR)

(73) Assignee: East Global Co., Ltd., Incheon (KR)

( * ) Notice: Subject to any disclaimer, the term of this patent is extended or adjusted under 35 U.S.C. 154(b) by 30 days.

(21) Appl. No.: 16/820,740

(22) Filed: Mar. 17, 2020

(65) Prior Publication Data

US 2020/0344337 A1 Oct. 29, 2020

(30) Foreign Application Priority Data

Apr. 23, 2019 (KR) .......................... 10-2019-0047543

(51) Int. Cl.
*H04M 1/02* (2006.01)
*G06F 1/16* (2006.01)
*G06F 3/0354* (2013.01)

(52) U.S. Cl.
CPC ........ *H04M 1/0216* (2013.01); *G06F 1/1681* (2013.01); *G06F 3/03545* (2013.01)

(58) Field of Classification Search
CPC . H04M 1/0216; G06F 1/1681; G06F 3/03545
See application file for complete search history.

(56) References Cited

U.S. PATENT DOCUMENTS

| 2016/0165697 A1* | 6/2016 | Jang ...................... H05B 33/04 313/511 |
| 2020/0183457 A1* | 6/2020 | Youn ...................... G06F 1/1652 |
| 2020/0257334 A1* | 8/2020 | Han ...................... H04M 1/0268 |
| 2020/0344337 A1* | 10/2020 | Lee ...................... G06F 1/1681 |

FOREIGN PATENT DOCUMENTS

| JP | 2008-140648 A | 6/2008 |
| KR | 10-2013-0062210 A | 6/2013 |
| KR | 10-2018-0015515 A | 2/2018 |

* cited by examiner

*Primary Examiner* — Md K Talukder
(74) *Attorney, Agent, or Firm* — Revolution IP, PLLC

(57) ABSTRACT

A hinge structure for foldable devices includes a smartpen receiving portion adapted to receive a smartpen therein, thereby improving portability of the smartpen and the foldable devices, wherein the hinge structure for foldable devices is formed between a first display panel and a second display panel to connect the first display panel to the second display panel, is adapted to implement folding and unfolding operations of the first and second display panels, and includes a smartpen receiving portion formed at a boundary of the first and second display panels and having an inner diameter corresponding to an outer diameter of the smartpen.

2 Claims, 4 Drawing Sheets

HINGE STRUCTURE FOR FOLDABLE DEVICE INCLUDING SMARTPEN RECEIVING PORTION

FIELD

The present invention relates to a hinge structure for foldable devices, which includes a smartpen receiving portion, and, more particularly, to a hinge structure for foldable devices, which includes a smartpen receiving portion adapted to receive a smartpen therein, thereby improving portability of the smartpen and the foldable devices.

BACKGROUND

A smartpen is a pen that is used in the same way as a normal pen and is adapted to save handwritten input data as a digital file, and has two different ways to save the handwritten input data. In one way, as a user writes a note on a paper, the pattern of which has been recognized, a camera provided to the smartpen recognizes the location of the note based on the pattern of the paper to recode the note. In another way, the location of a written note is ultrasonically recognized using a receiver provided separately from the smartpen. Such a smartpen is actively used with development of smartphones, tablet PCs, and the like.

Recently, with advantages of flexible display panels that can be bent or folded, foldable displays, bendable displays, rollable displays, and the like are under research and development. Such displays can be applied to various fields including portable electronic devices, wearable electronic devices, televisions, and monitors.

As one example of the related art, Korean Patent Laid-open Publication No. 10-2018-0015515 discloses a method and system for learning languages using a smartpen, more particularly, a language learning system using a smartpen, in which, as a user writes words or sentences to be learned on a sheet of paper with a specific code printed thereon with a smartpen, the smartpen sends coordinate values corresponding to the movement trajectory of the smartpen to a user device, which, in turn, recognizes handwritten text based on the coordinate values and provides feedback to the user based on the recognized handwritten text, thereby allowing more efficient learning of languages such as English or Chinese.

However, this language learning system has a problem of discomfort in carrying the smartpen together with a smartphone.

SUMMARY

Embodiments of the present invention have been conceived to solve such a problem in the art and it is one aspect of the present invention to provide a hinge structure for foldable devices, which can improve portability of a smartpen having a smaller size than a foldable device.

It is another aspect of the present invention to provide a hinge structure for foldable devices, which can receive a smartpen having various shapes therein.

It is a further aspect of the present invention to provide a hinge structure for foldable devices, which includes a smartpen receiving portion adapted to receive the entirety of a smartpen therein such that the hinge structure and the foldable device can have a pleasant appearance or adapted to receive only a portion of the smartpen such that the smartpen can be easily taken out of the smartpen receiving portion.

In order to solve the above problem, the present invention has the following features.

A hinge structure for foldable devices according to the present invention is formed between a first display panel and a second display panel to connect the first display panel to the second display panel, is adapted to implement folding and unfolding operations of the first and second display panels, and includes a smartpen receiving portion formed at a boundary of the first and second display panels and having an inner diameter corresponding to an outer diameter of the smartpen.

In addition, the smartpen receiving portion may have a cross-sectional shape selected from the group of circular, elliptical, semicircular, rectangular, and polygonal shapes.

Further, the smartpen receiving portion may have a depth corresponding to or smaller than a length of the smartpen to receive the entirety or a portion of the smartpen therein.

The present invention provides a hinge structure for foldable devices, which includes a smartpen receiving portion, thereby allowing a smartpen to be easily carried together with a foldable device.

In addition, according to the present invention, the smartpen receiving portion has a cross-sectional shape selected from the group of circular, elliptical, semicircular, rectangular, and polygonal shapes to receive a smart pen having various shapes therein.

Further, according to the present invention, the smartpen receiving portion has a depth corresponding to a length of a smartpen to receive the entirety of a smartpen therein such that the hinge structure and the foldable device can have a pleasant appearance, or has a depth smaller than the length of the smartpen to receive only a portion of the smartpen therein such that the smartpen can be easily taken out of the smartpen receiving portion.

DRAWINGS

DETAILED DESCRIPTION

Hereinafter, embodiments of the present invention will be described in detail. However, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

It will be understood that, although the terms "first", "second", etc. may be used herein to describe various elements or components, these elements or components should not be limited by these terms. These terms are only used to distinguish one element or component from another element or component, no matter what order the elements or components are fabricated. Thus, a "first" element or component discussed below could also be termed a "second" element or component, or vice versa, without departing from the scope of the present invention.

It will be understood that, when an element is referred to as being "connected to" another element, it can be directly connected to the other element, or can be electrically or indirectly connected to the other element with a different element interposed therebetween.

The present invention relates to a hinge structure for foldable devices, which includes a smartpen receiving portion, and, hereinafter, for convenience of description, a hinge structure for foldable devices including a smartpen receiving portion according to one embodiment of the present invention will be referred to as a "hinge structure for foldable devices".

Figure 1:
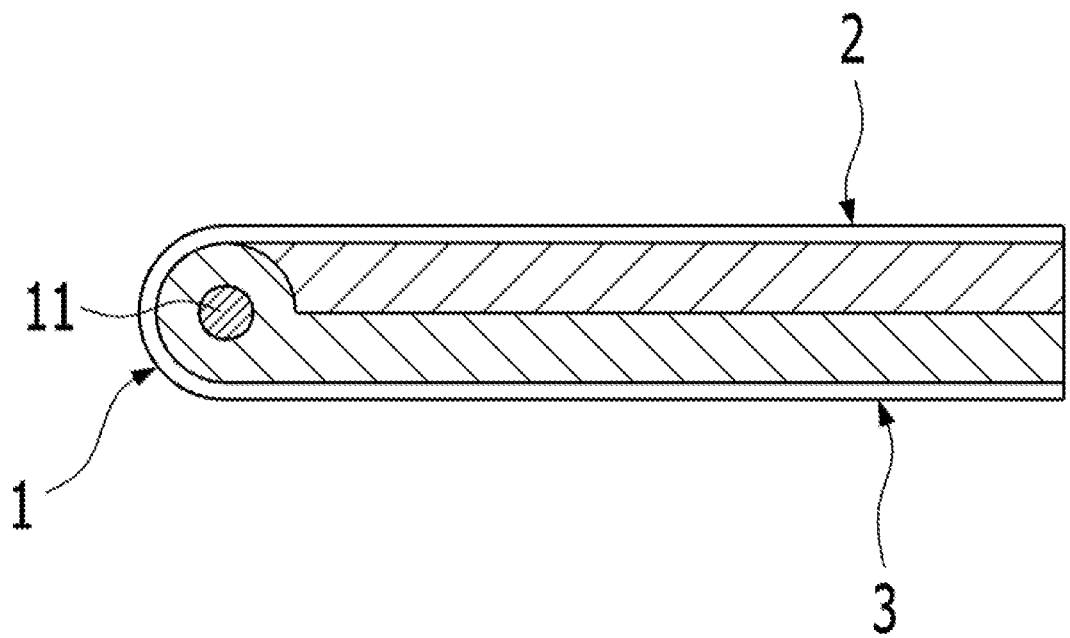
FIG. 1 is a sectional plane view of a hinge structure for foldable devices including a smartpen receiving portion according to one embodiment of the present invention, in which a foldable device is in a folded position.

FIG. 1 is a sectional plane view of a hinge structure for foldable devices including a smartpen receiving portion according to one embodiment of the present invention, in which a foldable device is in a folded position.

Referring to FIG. 1, the hinge structure 1 for foldable devices is formed between a first display panel 2 and a second display panel 3 to connect the first display panel 2 to the second display panel 3 and is adapted to implement folding (see FIG. 1) and unfolding operations of the first display panel 2 and the second display panel 3.

More specifically, the first display panel 2 and the second display panel 3 are moved to a mutually unfolded position as the hinge structure 1 for foldable devices is rotated in one direction about the smartpen receiving portion 11 described below. Referring to FIG. 1 by way of example, the first display panel 2 is rotated counterclockwise by a maximum of about 180 degrees (from the 3 o'clock position to the 9 o'clock position in FIG. 1) about the smartpen receiving portion 11 described below, whereby the first display panel 2 and the second display panel 3 can be retained in the mutually unfolded position (it will be understood that the second display panel 3 is rotated clockwise by a maximum of about 180 degrees (from the 3 o'clock position to the 9 o'clock position in FIG. 1) about the smartpen receiving portion 11 described below, whereby the first display panel 2 and the second display panel 3 can be retained in the mutually unfolded position). In addition, the first display panel 2 and the second display panel 3 are moved from the mutually unfolded position to a mutually folded position as the hinge structure 1 is rotated in the opposite direction to the one direction about the smartpen receiving portion 11 described below.

Figure 2:
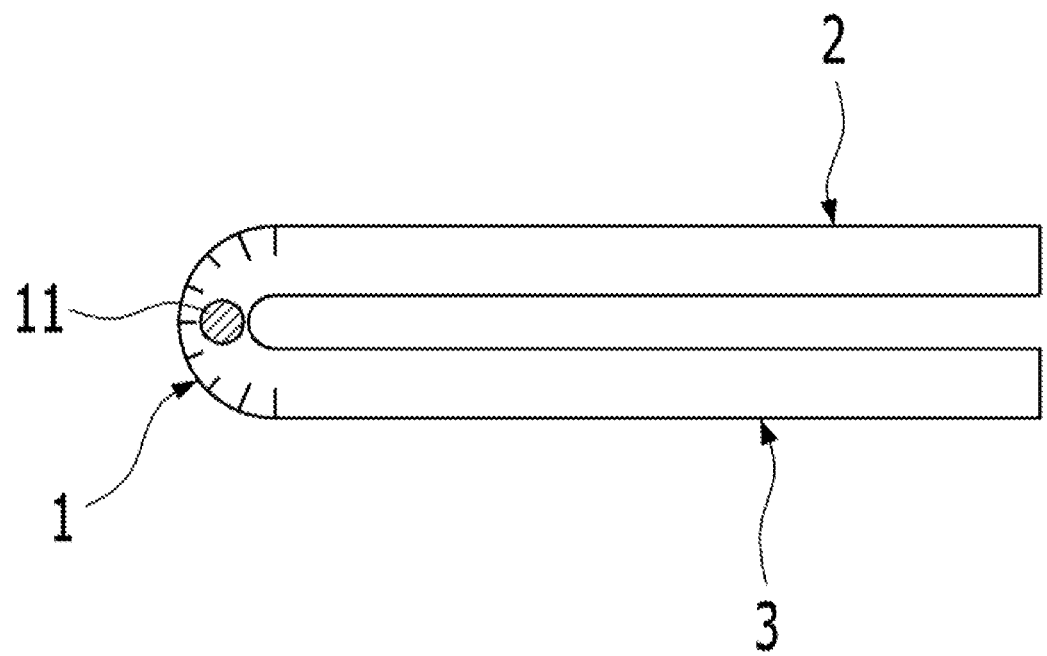
FIG. 2 is a sectional plane view of a hinge structure for foldable devices including a smartpen receiving portion according to another embodiment of the present invention, in which the foldable device is in a folded position.

FIG. 2 is a sectional plane view of a hinge structure for foldable devices including a smartpen receiving portion according to another embodiment of the present invention, wherein the foldable device is in a folded position.

Referring to FIG. 1 and FIG. 2, the hinge structure 1 for foldable devices according to the present invention may be provided in the form of a liquid crystal panel (see FIG. 2) that is connected between the first display panel 2 and the second display panel 3 and is elastically deformable to allow the foldable device to be folded/unfolded, as well as in the form of a hinge structure, as shown in FIG. 1. That is, the hinge structure 1 for foldable devices should be understood as including various embodiments allowing the foldable device to be folded/unfolded.

Referring to FIG. 1 and FIG. 2, the hinge structure 1 for foldable devices includes the smartpen receiving portion 11 formed at the boundary between the first display panel 2 and the second display panel 3 and having an inner diameter corresponding to the outer diameter of the smartpen P. Herein, the outer diameter of the smartpen P is an outer diameter of a cross-sectional area of the smartpen P centered on the longitudinal axis of the smartpen P, and may refer to a diameter (outer diameter) of the smartpen P in the 2 o'clock-8 o'clock direction in FIG. 3 described below. In addition, the inner diameter of the smartpen receiving portion 11 may refer to the diameter (inner diameter) of the smartpen receiving portion 11 in FIG. 1 and FIG. 2. That is, the smartpen receiving portion 11 has an inner diameter corresponding to or slightly larger than the outer diameter of the smartpen P to receive the smartpen P therein.

As such, since the hinge structure 1 for foldable devices includes the smartpen receiving portion 11 adapted to receive the smartpen P therein, the smartpen P can be carried with ease together with the foldable device. More specifically, the smartpen P is relatively small as compared with the foldable device and thus is liable to be lost. According to the present invention, since the smartpen P is held in the smartpen receiving portion 11 of the hinge structure 1 for foldable devices, the smartpen P and the foldable device can be handled as one unit, thereby reducing the risk of losing the smartpen P. Further, since the smartpen P, which has a predetermined volume, is received in the smartpen receiving portion 11, a volume required to carry the smartpen P and the foldable device (that is, the volume of a bag or a pocket) can be reduced, thereby improving portability.

Figure 3A:
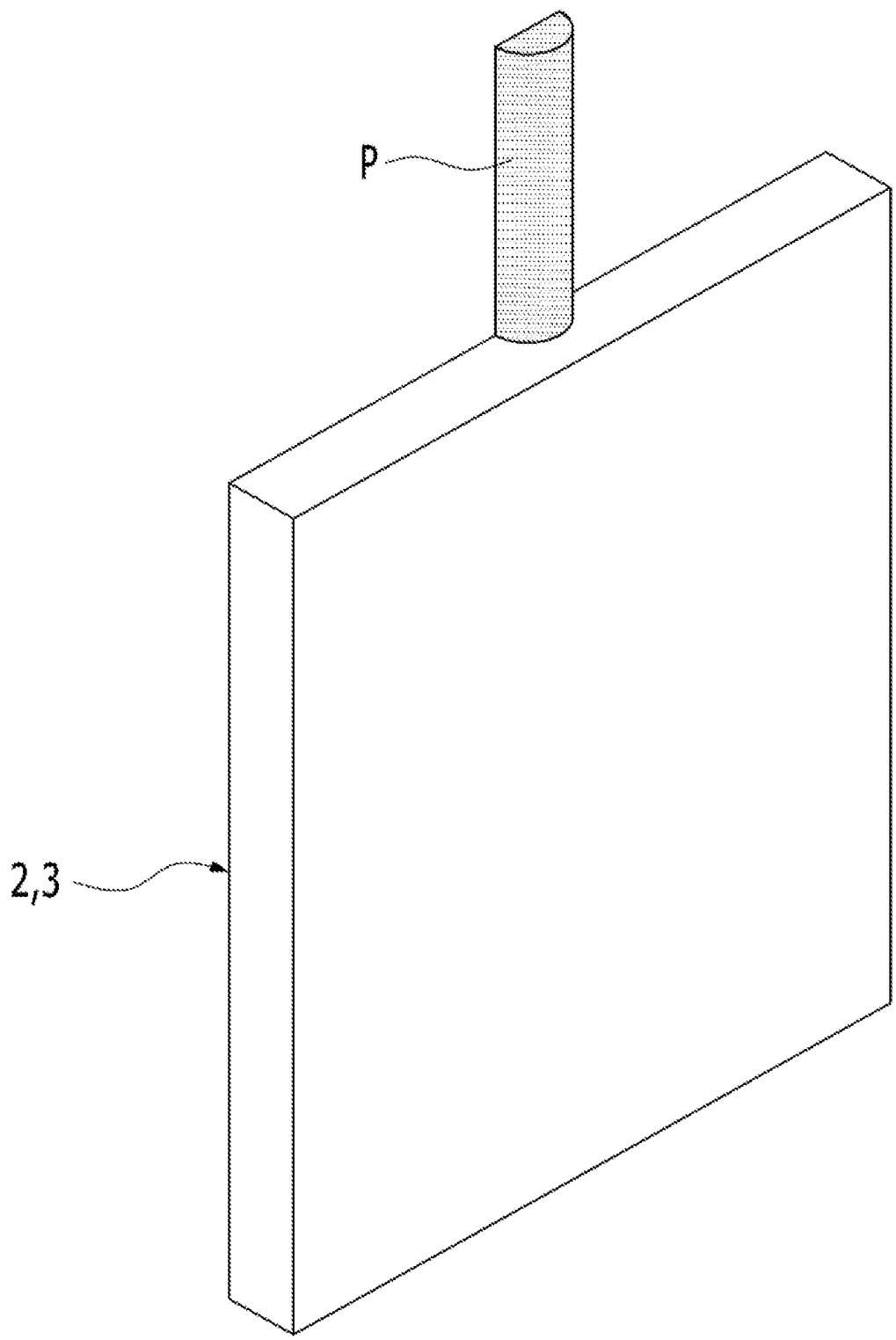
FIG. 3A is a perspective view of a hinge structure for foldable devices including a smartpen receiving portion according to the present invention, in which the foldable device is in an unfolded position with a smartpen received in the hinge structure.
Figure 3B:
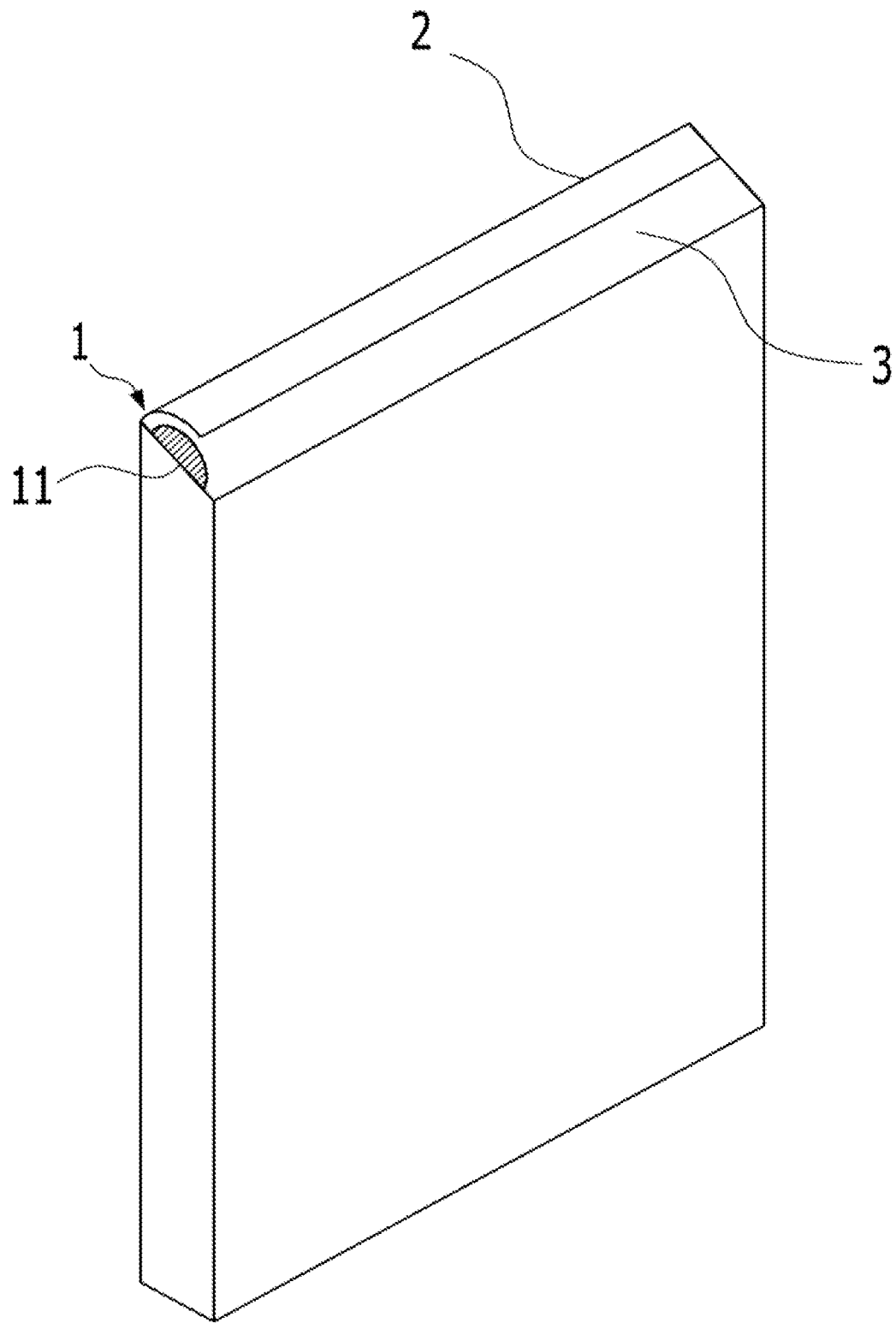
FIG. 3B is a perspective view of a hinge structure for foldable devices including a semicircular smartpen receiving portion having a semicircular cross-section according to the present invention, in which the foldable device is in a folded position.

FIG. 3A is a perspective view of the hinge structure for foldable devices including the smartpen receiving portion, in which the foldable device is in the unfolded position with the smartpen received in the hinge structure, and FIG. 3B is a perspective view of the hinge structure for foldable devices including the semicircular smartpen receiving portion having a semicircular cross-section, in which the foldable device is in the folded position.

Referring to FIG. 1 to FIG. 3B, the smartpen receiving portion 11 may have a cross-sectional shape selected from the group of circular (see FIG. 1), elliptical, semicircular (see FIG. 3B), rectangular, and polygonal shapes.

Herein, the cross-sectional shape of the smartpen receiving portion 11 may refer to a sectional plane shape in FIG. 3A and FIG. 3B (a cross-section centered on the 12 o'clock-6 o'clock axis in FIG. 3A and FIG. 3B).

Although the smartpen receiving portion 11 preferably has a cross-sectional shape corresponding to the cross-sectional shape of the smartpen P, it should be understood that the present invention is not limited thereto. That is, as described above, the cross-section of the smartpen receiving portion 11 may be any one selected from the group of circular, elliptical, semicircular, polygonal shapes, so long as the smartpen receiving portion has an inner diameter larger than the outer diameter of the smartpen P. It should be understood that the smartpen receiving portion 11 may have various cross-sectional shapes other than the aforementioned shapes.

When the cross-sectional shape of the smartpen receiving portion 11 corresponds to the cross-sectional shape of the smartpen P, the volume of the internal space of the smartpen receiving portion 11 can be reduced as much as possible and thus the size of the hinge structure 1 for foldable devices can be reduced as much as possible. In addition, the smartpen receiving portion 11 can receive the smartpen (P) having various cross-sectional shapes so long as the inner diameter of the smartpen receiving portion 11 is larger than the outer diameter of the smartpen (P), thereby improving applicability of the hinge structure 1 for foldable devices. Further, since the cross-section of the smartpen receiving portion 11 may be any one selected from the group of circular, elliptical, semicircular, rectangular, and polygonal shapes, the foldable device can be manufactured in various shapes while reducing the size of the foldable device as much as possible. Referring to FIG. 3B by way of example, the smartpen receiving portion 11 may have a semicircular cross-section rather than a circular cross-section (see the left of FIG. 1 or FIG. 2), whereby the foldable device can be manufactured in a rectangular shape while reducing the volume of the foldable device as much as possible.

Referring to FIG. 1 to FIG. 3B, the smartpen receiving portion 11 may having a depth corresponding to (see FIG. 3B) or smaller than (see FIG. 3A) the length of the smartpen P to receive the entirety (see FIG. 3B) or a portion (see FIG. 3A) of the smartpen P therein.

Here, the depth of the smartpen receiving portion 11 is a longitudinal length of the smartpen receiving portion 11 and may refer to a length of the smartpen receiving portion in the 12 o'clock-6 o'clock direction in FIG. 3A, and the length of the smartpen P may also refer to a length of the smartpen P in the 12 o'clock-6 o'clock direction in FIG. 3A.

When the smartpen receiving portion 11 has a depth corresponding to the length of the smartpen P to receive the entirety of the smartpen P, there is an advantage in that the foldable device with the smartpen P held therein can have a pleasant appearance, whereas, when the smartpen receiving portion 11 has a depth smaller than the length of the smartpen P to receive a portion of the smartpen P, the smartpen P can be easily taken out of the smartpen receiving portion 11.

Figure 4:
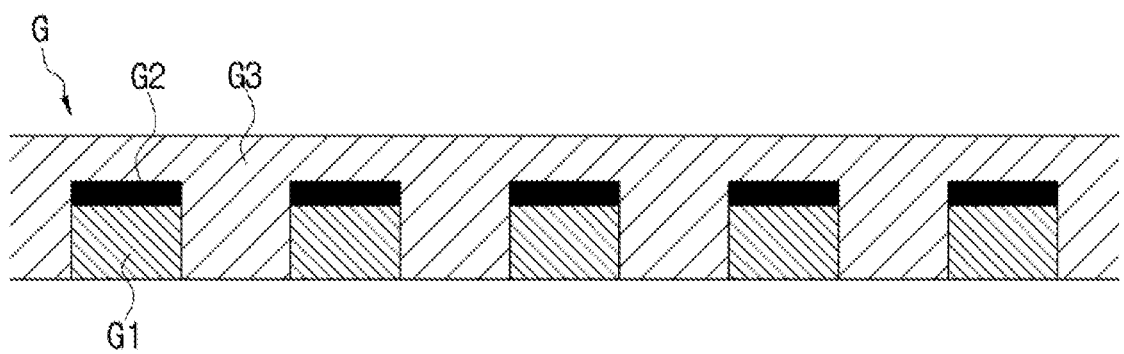
FIG. 4 is a view of a protective film formed on an inner surface of a smartpen receiving portion according to the present invention.

FIG. 4 is a view of a protective film on an inner surface of the smartpen receiving portion.

Referring to FIG. 1 to FIG. 4, since the inner surface of the smartpen receiving portion 11 is always exposed to an external environment due to the nature thereof and the smartpen P is repeatedly put into and taken out of the smartpen receiving portion 11, the inner surface of the smartpen receiving portion 11 needs to be appropriately protected to avoid damage, warpage, corrosion, and the like due to impact, scratches, moisture intrusion, and the like.

According to the present invention, a protective film is formed on the inner surface of the smartpen receiving portion 11 to protect the inner surface of the smartpen receiving portion 11. Specifically, referring to FIG. 4, the hinge structure for foldable devices according to the present invention may further include a protective film G including a plurality of porous layers G1 formed at predetermined intervals on the inner surface of the smartpen receiving portion 11, a plurality of heat generating layers G2 formed on respective porous layers G1, and a protective layer G3 covering an outer surface of a cover 54, including the porous layers G1 and the heat generating layers G2.

Specifically, the porous layer G1 serves to impart buffering properties to the protective film G and includes 100 parts by weight of expanded polystyrene, 5 parts by weight of antimony trioxide ($Sb_2O_3$), 7 parts by weight of melamine polyphosphate, and 10 parts by weight of expanded graphite.

Despite low flame retardancy, the expanded polystyrene has advantages of high thermal insulation performance and low manufacturing cost. The amount of each component of the porous layer G1 is determined relative to 100 parts by weight of expanded polystyrene.

In addition, antimony trioxide ($Sb_2O_3$) is a metal oxide obtained from stibnite and has better flame retardancy than other flame retardant materials. Preferably, the antimony trioxide is present in an amount of 5 parts by weight relative to 100 parts by weight of expanded polystyrene. If the amount of the antimony trioxide exceeds this value, the antimony trioxide can generate harmful radical compounds upon combustion thereof and economic feasibility can be reduced due to relatively high price of the antimony trioxide.

Melamine polyphosphate is a polyphosphate compound and serves to form a glass coating film to block access of oxygen. Repeated experiments show that the optimal amount of the melamine polyphosphate for formation of a glass coating film having an appropriate thickness is 7 parts by weight relative to 100 parts by weight of the expanded polystyrene.

The expanded graphite is a graphite compound that generates carbides upon combustion thereof and serves to impart flame retardancy to the protective film. Preferably, the expanded graphite is present in an amount of 10 parts by weight relative to 100 parts by weight of the expanded polystyrene. Repeated experiments show that, when the weight ratio of the melamine polyphosphate to the expanded graphite is 0.7:1, flame retardancy of the protective film can be maximized. Thus, it can be concluded that a preferable amount of the expanded graphite is 10 parts by weight relative to 100 parts by weight of the expanded polystyrene.

The porous layer G1 is prepared by dispersing the aforementioned components in water as a solvent, followed by curing. Here, details of the process of curing the porous layer G1 fall outside the scope of the present invention and follow the known technique and common sense of those skilled in the art.

The heat generating layer G2 is formed on the porous layer G1 and generates heat upon irradiation with sunlight such that the porous layer G1 and the protective layer G3 can be self-fused and self-kneaded with each other. At room temperature, it takes a long time (for example, 24 hours or more) to complete the kneading process. Thus, the heat generating layer G2 serves to provide temperature conditions of about 40° C. to 60° C. to shorten kneading time to less than 30 minutes. The heat generating layer G2 includes 100 parts by weight of tetrachloro-gold (III) acid, 5 parts by weight of manganese dioxide, and 3 parts by weight of silica gel.

The tetrachloro-gold (III) acid ($HAuCl_4$) is a pale-yellow crystal obtained by dissolving gold in aqua regia or by dissolving gold chloride (III) in hydrochloric acid. Exothermic efficiency of the tetrachloro-gold (III) acid varies depending on the particle size thereof, and, preferably, the tetrachloro-gold (III) acid has an average particle size of 15 nm to 30 nm. The amount of each component of the heat generating layer G2 is determined relative to 100 parts by weight of the tetrachloro-gold (III) acid.

Manganese dioxide ($MnO_2$) is a compound in which manganese is combined with oxygen, and serves to facilitate dispersion of the heat generating layer G2 and to optimize available solar wavelength bands. In particular, the manganese dioxide has the highest emissivity and radiant energy efficiency in the far-infrared band, among group 4 transition metals, such as titanium, chrome, nickel, and copper. The manganese dioxide is prepared by sintering at about 1,000° C. in the presence of oxygen. Since the induction heating effect of the manganese dioxide increases with decreasing particle size of the manganese dioxide, it is desirable that the manganese dioxide have an average particle diameter of 10 nm to 100 nm. Preferably, the manganese dioxide is present in an amount of 5 parts by weight. Repeated experiments show that the manganese dioxide exhibits optimal thermal conduction efficiency when the amount of the manganese dioxide is 5 parts by weight.

The silica gel serves to sustain the exothermic effect of the heat generating layer G2 and to shorten exothermic saturation time. Repeated experiments show that the heat generating layer G2 exhibits optimal exothermic efficiency when the amount of the silica gel is 3 parts by weight.

The heat generating layer G2 is prepared by a procedure in which an aqueous solution of tetrachloro-gold (III) acid is heated at about 100° C. for 10 minutes, a small amount of citric acid is added to and dissolved in the heated solution, and the manganese dioxide and the silica gel are mixed with and dispersed in the resulting aqueous solution in the aforementioned mixing ratio, followed by a predetermined drying process. Here, details of the drying process follow known technology and the common sense of those skilled in the art.

The protective layer G3 is a basic component of the protective film G and covers the entire region to be protected, including the porous layers G1 and the heat generating layers G2. The protective layer G3 includes: 100 parts by weight of silica-bound water including 5 wt % of tetraethoxysilane, 5 wt % of methyltriethoxysilane, and the balance of water; 10 parts by weight of pozzolan; 3 parts by weight of a surfactant; 1 part by weight of bentonite; 40 parts by weight of hydroxyethyl acrylate; and 3 parts by weight of ethylenediaminetetraacetate.

The silica-bound water is added for geopolymerization of the pozzolan, and preferably contains a large amount of silica (SiO). The silica-bound water includes 5 wt % of tetraethoxysilane (TEOS), 5 wt % of methyltriethoxysilane (MTES), and the balance of water, based on the total weight of the silica-bound water. The tetraethoxysilane serves to form a stable network structure of silica molecules, and the methyltriethoxysilane serves to increase flexibility of the network. If the amount of the tetraethoxysilane is less than the above value, the protective layer G3 can have low hardness, whereas, if the amount of the tetraethoxysilane exceeds the above value, the amount of a silica precursor is excessively high, causing generation of cracks upon drying.

In addition, if the amount of the methyltriethoxysilane is less than the above value, flexibility of the network can be deteriorated, whereas, if the amount of the methyltriethoxysilane exceeds the above value, the protective layer G3 can have low hardness. The amount of each component of the protective layer G3 is determined relative to 100 parts by weight of the silica-bound water.

The pozzolan is a main binder in geopolymerization reaction and may include natural pozzolans, such as volcanic ash, and artificial pozzolans, such as fine slag powder, fly ash, and silica fume. Preferably, the pozzolan is present in an amount of 10 parts by weight. The amount of the pozzolan may exceed the above value to some but not an excessive extent. However, if the amount of the pozzolan is less than the above value, the protective layer can have poor strength.

The surfactant serves to improve workability and the bentonite serves as a thixotropic agent to prevent detachment of the protective layer through modification of viscoelasticity of the protective layer. Each of the surfactant and the bentonite may include any suitable commercially available product in view of known technology and the common sense of those skilled in the art, so long as each of the surfactant and the bentonite is present in the amount specified above. If the amount of each of the surfactant and the bentonite exceeds or is less than the above value, flowability of the protective layer can depart from a reference value.

The hydroxyethyl acrylate serves as an adhesion promoter, and, particularly, has an advantage of high curability. Repeated experiments show that a preferable amount of the hydroxyethyl acrylate is 40 parts by weight. If the amount of the hydroxyethyl acrylate is less than this value, adhesion promotion by the hydroxyethyl acrylate is insignificant, whereas, if the amount of the hydroxyethyl acrylate exceeds this value, the protective layer can have high volatility and strong toxicity.

The ethylenediaminetetraacetate is added as an adsorption enhancer to enhance adsorption force upon initial formation of the protective film G to eventually improve adhesion of the protective film G. Repeated experiments show that, when the amount of the ethylenediaminetetraacetate is 3 parts by weight, the ethylenediaminetetraacetate provides optimal adsorption enhancement.

The protective layer G3 is prepared by a procedure in which aforementioned components are mixed and stirred in a stirrer, followed by predetermined drying and curing processes.

In an experimental example of formation of the protective film G, the porous layers G1, the heat generating layers G2, and the protective layer G3 were sequentially formed in a test block and then left in an environment with sunlight to be kneaded together, followed by curing, thereby forming a protective film G. The formed protective film G was subjected to a cross-cut test, a scratching test, a burning test through flame spraying, and a moisture intrusion test through water spraying. The tests showed that the protective film G had a detachment rate of less than 1% and a damage rate of less than 5%, the porous layers G1 did not burn, and no moisture intrusion occurred.

It should be understood that various modifications, changes, alterations, and equivalent embodiments can be made by those skilled in the art without departing from the spirit and scope of the invention.

What is claimed is:

1. A hinge structure for foldable devices, which is formed between a first display panel and a second display panel to connect the first display panel to the second display panel and is adapted to implement folding and unfolding operations of the first and second display panels, the hinge structure comprising:
  a smartpen receiving portion formed at a boundary of the first and second display panels and having an inner diameter corresponding to an outer diameter of the smartpen,
  wherein the smartpen receiving portion has a depth corresponding to or smaller than a length of the smartpen to receive an entirety or a portion of the smartpen and comprises a protective film comprising: a plurality of porous layers formed at predetermined intervals on an inner surface of the smartpen receiving portion; a plurality of heat generating layers formed on respective porous layers; and a protective layer covering the entire inner surface of the smartpen receiving portion comprising the porous layers and the heat generating layers,
  the porous layer comprises 100 parts by weight of expanded polystyrene, 5 parts by weight of antimony trioxide ($Sb_2O_3$), 7 parts by weight of melamine polyphosphate, and 10 parts by weight of expanded graphite,
  the heat generating layer comprises 100 parts by weight of tetrachloro-gold (III) acid, 5 parts by weight of manganese dioxide, and 3 parts by weight of silica gel, and
  the protective layer comprises 100 parts by weight of silica-bound water comprising 5 wt % of tetraethoxysilane, 5 wt % of methyltriethoxysilane, and a balance of water, 10 parts by weight of pozzolan, 3 parts by weight of a surfactant, 1 part by weight of bentonite, 40 parts by weight of hydroxyethyl acrylate, and 3 parts by weight of ethylenediaminetetraacetate.

2. The hinge structure according to claim 1, wherein the smartpen receiving portion has a cross-sectional shape selected from the group of circular, elliptical, semicircular, rectangular, and polygonal shapes.

\* \* \* \* \*